US008862299B2

(12) United States Patent
Ricci

(10) Patent No.: US 8,862,299 B2
(45) Date of Patent: Oct. 14, 2014

(54) BRANDING OF ELECTRICALLY PROPELLED VEHICLES VIA THE GENERATION OF SPECIFIC OPERATING OUTPUT

(71) Applicant: Flextronics AP, LLC, Milpitas, CA (US)

(72) Inventor: Christopher P. Ricci, Saratoga, CA (US)

(73) Assignee: Flextronics AP, LLC, San Jose, CA (US)

( * ) Notice: Subject to any disclaimer, the term of this patent is extended or adjusted under 35 U.S.C. 154(b) by 0 days.

(21) Appl. No.: 13/679,292

(22) Filed: Nov. 16, 2012

(65) Prior Publication Data

US 2013/0144474 A1 Jun. 6, 2013

Related U.S. Application Data

(60) Provisional application No. 61/560,509, filed on Nov. 16, 2011, provisional application No. 61/637,164, filed on Apr. 23, 2012, provisional application No. 61/646,747, filed on May 14, 2012, provisional application No. 61/653,275, filed on May 30, 2012, provisional application No. 61/653,264, filed on May 30, 2012, provisional application No. 61/653,563, filed on May 31, 2012, provisional application No. 61/663,335, filed on Jun. 22, 2012, provisional application No. 61/672,483, filed on Jul. 17, 2012, provisional application No. 61/714,016, filed on Oct. 15, 2012, provisional application No. 61/715,699, filed on Oct. 18, 2012.

(51) Int. Cl.
*B60L 9/00* (2006.01)
*B60T 7/16* (2006.01)
*H02P 1/00* (2006.01)

(52) U.S. Cl.
USPC .............................. 701/22; 180/167; 318/139

(58) Field of Classification Search
USPC .............. 701/22; 180/167–300; 318/139–383
See application file for complete search history.

(56) References Cited

U.S. PATENT DOCUMENTS

| 5,045,016 | A | 9/1991 | Stern et al. |
| 5,371,802 | A | 12/1994 | McDonald et al. |
| 5,553,661 | A | 9/1996 | Beyerlein et al. |
| 5,619,179 | A | 4/1997 | Smith |
| 5,691,893 | A | 11/1997 | Stothers |
| 6,278,919 | B1 | 8/2001 | Hwang et al. |
| 6,289,332 | B2 | 9/2001 | Menig et al. |
| 6,454,178 | B1 | 9/2002 | Fusco et al. |
| 6,487,500 | B2 | 11/2002 | Lemelson et al. |

(Continued)

FOREIGN PATENT DOCUMENTS

WO WO 2011/147893 12/2011

OTHER PUBLICATIONS

U.S. Appl. No. 13/462,593, filed May 2, 2012, Ricci et al.
U.S. Appl. No. 13/462,596, filed May 2, 2012, Ricci et al.

(Continued)

*Primary Examiner* — Thomas Black
*Assistant Examiner* — Tyler Paige
(74) *Attorney, Agent, or Firm* — Sheridan Ross P.C.

(57) ABSTRACT

The present disclosure is related to a perceptible output control system for a vehicle that can perform a number of different operations that are particularly useful for electric vehicles.

31 Claims, 4 Drawing Sheets

(56) References Cited

U.S. PATENT DOCUMENTS

| | | | |
|---|---|---|---|
| 6,668,219 B2 | 12/2003 | Hwang et al. | |
| 7,089,099 B2 | 8/2006 | Shostak et al. | |
| 7,127,348 B2 | 10/2006 | Smitherman et al. | |
| 7,140,338 B2* | 11/2006 | Janisch | 123/179.2 |
| 7,231,285 B2 | 6/2007 | Noguchi | |
| 7,418,346 B2 | 8/2008 | Breed et al. | |
| 7,492,283 B1 | 2/2009 | Racunas, Jr. | |
| 7,629,899 B2 | 12/2009 | Breed | |
| 7,663,502 B2 | 2/2010 | Breed | |
| 7,738,462 B2 | 6/2010 | Hwang | |
| 8,068,016 B2 | 11/2011 | Toh | |
| 8,138,950 B1 | 3/2012 | Leung | |
| 8,140,358 B1 | 3/2012 | Ling et al. | |
| 8,671,002 B2 | 3/2014 | Stefik et al. | |
| 2002/0008639 A1 | 1/2002 | Dee | |
| 2002/0049527 A1 | 4/2002 | Kohno et al. | |
| 2002/0103583 A1 | 8/2002 | Ohmura et al. | |
| 2002/0198632 A1 | 12/2002 | Breed et al. | |
| 2003/0028292 A1 | 2/2003 | Ueda | |
| 2003/0132840 A1 | 7/2003 | Bahar | |
| 2003/0204290 A1 | 10/2003 | Sadler et al. | |
| 2004/0082350 A1 | 4/2004 | Chen et al. | |
| 2004/0267410 A1 | 12/2004 | Duri et al. | |
| 2005/0024189 A1 | 2/2005 | Weber | |
| 2005/0088318 A1 | 4/2005 | Liu et al. | |
| 2005/0107954 A1 | 5/2005 | Nahla | |
| 2005/0131595 A1 | 6/2005 | Luskin et al. | |
| 2005/0143876 A1* | 6/2005 | Tanase | 701/22 |
| 2006/0030981 A1 | 2/2006 | Robb et al. | |
| 2006/0142933 A1 | 6/2006 | Feng | |
| 2006/0267799 A1 | 11/2006 | Mendelson | |
| 2006/0269078 A1* | 11/2006 | Sakamoto et al. | 381/71.1 |
| 2007/0008181 A1 | 1/2007 | Rollert et al. | |
| 2007/0014423 A1 | 1/2007 | Darbut et al. | |
| 2007/0021915 A1 | 1/2007 | Breed et al. | |
| 2008/0059050 A1 | 3/2008 | Lin et al. | |
| 2008/0060861 A1* | 3/2008 | Baur et al. | 180/65.6 |
| 2008/0077326 A1 | 3/2008 | Funk et al. | |
| 2008/0114675 A1 | 5/2008 | Ward | |
| 2008/0133507 A1 | 6/2008 | Alter et al. | |
| 2008/0291054 A1 | 11/2008 | Groft | |
| 2008/0319602 A1 | 12/2008 | McClellan et al. | |
| 2009/0143951 A1 | 6/2009 | Takahashi et al. | |
| 2010/0023223 A1 | 1/2010 | Huang et al. | |
| 2010/0076646 A1 | 3/2010 | Basir et al. | |
| 2010/0089307 A1 | 4/2010 | Kenchington | |
| 2010/0191584 A1 | 7/2010 | Fraser et al. | |
| 2010/0214411 A1 | 8/2010 | Weinmann et al. | |
| 2010/0227555 A1 | 9/2010 | Zinn et al. | |
| 2010/0302067 A1 | 12/2010 | Goldman et al. | |
| 2010/0305819 A1 | 12/2010 | Pihlajamaki | |
| 2010/0318226 A1 | 12/2010 | Augusto et al. | |
| 2011/0006903 A1 | 1/2011 | Niem | |
| 2011/0009062 A1 | 1/2011 | Anschutz et al. | |
| 2011/0010269 A1* | 1/2011 | Ballard | 705/26.41 |
| 2011/0057815 A1 | 3/2011 | King et al. | |
| 2011/0062230 A1 | 3/2011 | Ward, II et al. | |
| 2011/0093149 A1* | 4/2011 | Tanaka | 701/22 |
| 2011/0095908 A1 | 4/2011 | Nadeem et al. | |
| 2011/0131358 A1 | 6/2011 | Ganesh et al. | |
| 2011/0137773 A1 | 6/2011 | Davis, III et al. | |
| 2011/0195699 A1 | 8/2011 | Tadayon et al. | |
| 2011/0224875 A1 | 9/2011 | Cuddihy et al. | |
| 2012/0083995 A1 | 4/2012 | Vorona | |
| 2012/0095812 A1 | 4/2012 | Stefik et al. | |
| 2012/0101690 A1 | 4/2012 | Srinivasan et al. | |
| 2012/0130580 A1* | 5/2012 | Omote et al. | 701/22 |
| 2012/0143391 A1 | 6/2012 | Gee | |
| 2012/0265434 A1 | 10/2012 | Woodard et al. | |
| 2012/0276845 A1 | 11/2012 | Wikander | |
| 2013/0083467 A1 | 4/2013 | Becze | |
| 2013/0134730 A1 | 5/2013 | Ricci | |
| 2013/0135118 A1 | 5/2013 | Ricci | |
| 2013/0138591 A1 | 5/2013 | Ricci | |
| 2013/0138714 A1 | 5/2013 | Ricci | |
| 2013/0141247 A1 | 6/2013 | Ricci | |
| 2013/0141252 A1 | 6/2013 | Ricci | |
| 2013/0143495 A1 | 6/2013 | Ricci | |
| 2013/0143546 A1 | 6/2013 | Ricci | |
| 2013/0143601 A1 | 6/2013 | Ricci | |
| 2013/0144459 A1 | 6/2013 | Ricci | |
| 2013/0144460 A1 | 6/2013 | Ricci | |
| 2013/0144461 A1 | 6/2013 | Ricci | |
| 2013/0144462 A1 | 6/2013 | Ricci | |
| 2013/0144463 A1 | 6/2013 | Ricci et al. | |
| 2013/0144469 A1 | 6/2013 | Ricci | |
| 2013/0144470 A1 | 6/2013 | Ricci | |
| 2013/0144486 A1 | 6/2013 | Ricci | |
| 2013/0144520 A1 | 6/2013 | Ricci | |
| 2013/0144657 A1 | 6/2013 | Ricci | |
| 2013/0145065 A1 | 6/2013 | Ricci | |
| 2013/0145279 A1 | 6/2013 | Ricci | |
| 2013/0145297 A1 | 6/2013 | Ricci et al. | |
| 2013/0145360 A1 | 6/2013 | Ricci | |
| 2013/0145401 A1 | 6/2013 | Ricci | |
| 2013/0145482 A1 | 6/2013 | Ricci et al. | |
| 2013/0147638 A1 | 6/2013 | Ricci | |
| 2013/0151031 A1 | 6/2013 | Ricci | |
| 2013/0151065 A1 | 6/2013 | Ricci | |
| 2013/0151088 A1 | 6/2013 | Ricci | |
| 2013/0152003 A1 | 6/2013 | Ricci et al. | |
| 2013/0154298 A1 | 6/2013 | Ricci | |
| 2013/0158821 A1 | 6/2013 | Ricci | |
| 2013/0166097 A1 | 6/2013 | Ricci | |
| 2013/0167159 A1 | 6/2013 | Ricci et al. | |
| 2013/0241720 A1 | 9/2013 | Ricci et al. | |

OTHER PUBLICATIONS

U.S. Appl. No. 13/840,240, filed Mar. 15, 2013, Ricci.

International Search Report and Written Opinion for International (PCT) Patent Application No. PCT/US12/65423 mailed Apr. 26, 2013, 23 pages.

International Search Report and Written Opinion for International (PCT) Patent Application No. PCT/US12/65615 mailed Apr. 30, 2013, 15 pages.

International Search Report and Written Opinion for International (PCT) Patent Application No. PCT/US12/65477 mailed Apr. 26, 2013, 11 pages.

"Cadillac: 2013 XTS Full-Size Luxury Sedan," Cadillac.com, 4 pages, Jun. 2012 internet archive, found at: (web.archive.org/web/20120606185204/http://www.cadillac.com/xts-luxury-sedan.html).

"Time-triggered CAN," CIA, © 2001-2013, 4 pages, found at: (www.can-cia.org/index.php?id+166).

Davis et al. "Controller Area Network (CAN) schedulability analysis: Refuted, revisited and revised," Real-Time Systems, Apr. 2007, vol. 35, No. 3, pp. 239-272.

Di Natale "Controller Area Network," Dec. 2009, 54 pages.

Fonseca et al. "Scheduling for a TTCAN network with a stochastic optimization algorithm," Proceedings 8th Internatioanl CAN Conference, Jan. 2002, 7 pages.

HALOsonic (TM) Noise Management Solutions; Internet Article printed on May 2, 2012 from http://www.harman.com/automotive/en-us/products-innovations/innovations/halosonic . . . ; 3 pgs.

Hartwich et al. "CAN Network with Time Triggered Communication," Robert Bosch GmbH Proceedings 7th International CAN Conference, Jul. 2000, 7 pages.

Idstein et al. "Using the Controller Area Network for Communication Between Prostesis Sensors and Control Systems," Proceedings of the 2011 MyoElectric Controls/Powered Prostetics Symposium Fredericton, New Brunswick, Canada, Aug. 14-19, 2011, 4 pages.

Lotus Evora 414E Hybrid 2010; Internet Article printed on May 2, 2012 from http://www.dieselstation.com/cars/lotus-evora-414e-hybrid-2010-a2543.html; 5 pgs.

Lee "Cadillac revamps the instrument panel with CUE," CNET Reviews, Oct. 11, 2011, 5 pages, found at: (reviews.cnet.com/8301-12261_7-20118807-10356022/cadillac-revamps-the-instrument-panel-with-cue/).

Marturano "General Motors Takes a CUE from Customers," InContext, Nov. 8, 2011, 3 pages, found at: (incontextdesign.com/blog/general-motors-takes-a-cue-from-customers/).

(56) References Cited

OTHER PUBLICATIONS

Official Action for U.S. Appl. No. 13/678,745, mailed Oct. 1, 2013 8 pages.
Purcher "Apple Invents In-Vehicle Holistic ID for "iOS in the Car"," Patently Apple, Dec. 2013, 8 pages [retrieved on Dec. 12, 2013 from: www.patentlyapple.com/patently-apple/2013/12/apple-invents-in-vehicle-holistic-id-for-ios-in-the-car.html].
International Search Report and Written Opinion for International (PCT) Patent Application No. PCT/US2013/050600, mailed Jan. 9, 2014 9 pages.
Official Action for U.S. Appl. No. 13/678,710, mailed Dec. 31, 2013 8 pages.
Official Action for U.S. Appl. No. 13/678,726, mailed Nov. 7, 2013 9 pages.
Official Action for U.S. Appl. No. 13/678,726, mailed Jan. 28, 2014 10 pages.
Official Action for U.S. Appl. No. 13/678,745, mailed Feb. 6, 2014 9 pages.
International Preliminary Report on Patentability for International (PCT) Patent Application No. PCT/US12/65423 mailed May 20, 2014, 17 pages.
International Preliminary Report on Patentability for International (PCT) Patent Application No. PCT/US12/65615 mailed May 20, 2014, 10 pages.
Official Action for U.S. Appl. No. 13/678,710, mailed Jun. 9, 2014 10 pages.
Official Action for U.S. Appl. No. 13/678,722, mailed Mar. 27, 2014 6 pages.
Notice of Allowance for U.S. Appl. No. 13/678,726, mailed Mar. 28, 2014 7 pages.
Official Action for U.S. Appl. No. 13/678,735, mailed Apr. 24, 2014 9 pages.
Official Action for U.S. Appl. No. 13/678,745, mailed May 23, 2014 9 pages.
Official Action for U.S. Appl. No. 13/679,306, mailed May 7, 2014 7 pages.
Official Action for U.S. Appl. No. 13/679,400, mailed Apr. 18, 2014 10 pages.

* cited by examiner

BRANDING OF ELECTRICALLY PROPELLED VEHICLES VIA THE GENERATION OF SPECIFIC OPERATING OUTPUT

CROSS REFERENCE TO RELATED APPLICATION

The present application claims the benefits of U.S. Provisional Application Ser. Nos. 61/560,509, filed Nov. 16, 2011; 61/637,164, filed Apr. 23, 2012; and 61/663,335, filed Jun. 22, 2012, all entitled "COMPLETE VEHICLE ECOSYSTEM", 61/646,747, filed on May 14, 2012, entitled "Branding of Electrically Propelled Vehicles Via the Generation of Specific Operating Sounds"; 61/653,275, filed on May 30, 2012, entitled "Vehicle Application Store for Console"; 61/653,264, filed on May 30, 2012, entitled "Control of Device Features Based on Vehicle State"; 61/653,563, filed on May 31, 2012, entitled "Complete Vehicle Ecosystem"; 61/672,483, filed on Jul. 17, 2012, entitled "Vehicle Climate Control"; 61/714,016, filed on Oct. 15, 2012, entitled "Vehicle Middleware;" and 61/715,699, filed Oct. 18, 2012, entitled "Vehicle Middleware," each of which is incorporated herein by this reference in its entirety.

Cross reference is made to U.S. patent application Ser. No. 13/420,236, filed on Mar. 14, 2012, entitled, "Configurable Vehicle Console"; Ser. No. 13/420,240, filed on Mar. 14, 2012, entitled "Removable, Configurable Vehicle Console"; Ser. No. 13/462,593, filed on May 2, 2012, entitled "Configurable Dash Display"; Ser. No. 13/462,596, filed on May 2, 2012, entitled "Configurable Heads-Up Dash Display"; Ser. No. 13/679,459, filed on Nov. 16, 2012, entitled "Vehicle Comprising Multi-Operating System"; Ser. No. 13/679,234, filed on Nov. 16, 2012, entitled "Gesture Recognition for On-Board Display"; Ser. No. 13/679,412, filed on Nov. 16, 2012, entitled "Vehicle Application Store for Console"; Ser. No. 13/679,857, filed on Nov. 16, 2012, entitled "Sharing Applications/Media Between Car and Phone (Hydroid)"; Ser. No. 13/679,878, filed on Nov. 16, 2012, entitled "In-Cloud Connection for Car Multimedia"; Ser. No. 13/679,875, filed on Nov. 16, 2012, entitled "Music Streaming"; Ser. No. 13/679,676, filed on Nov. 16, 2012, entitled "Control of Device Features Based on Vehicle State"; Ser. No. 13/678,673, filed on Nov. 16, 2012, entitled "Insurance Tracking"; Ser. No. 13/678,691, filed on Nov. 16, 2012, entitled "Law Breaking/Behavior Sensor"; Ser. No. 13/678,699, filed on Nov. 16, 2012, entitled "Etiquette Suggestion"; Ser. No. 13/678,710, filed on Nov. 16, 2012, entitled "Parking Space Finder Based on Parking Meter Data"; Ser. No. 13/678,722, filed on Nov. 16, 2012, entitled "Parking Meter Expired Alert"; Ser. No. 13/678,726, filed on Nov. 16, 2012, entitled "Object Sensing (Pedestrian Avoidance/Accident Avoidance)"; Ser. No. 13/678,735, filed on Nov. 16, 2012, entitled "Proximity Warning Relative to Other Cars"; Ser. No. 13/678,745, filed on Nov. 16, 2012, entitled "Street Side Sensors"; Ser. No. 13/678,753, filed on Nov. 16, 2012, entitled "Car Location"; Ser. No. 13/679,441, filed on Nov. 16, 2012, entitled "Universal Bus in the Car"; Ser. No. 13/679,864, filed on Nov. 16, 2012, entitled "Mobile Hot Spot/Router/Application Share Site or Network"; Ser. No. 13/679,815, filed on Nov. 16, 2012, entitled "Universal Console Chassis for the Car"; Ser. No. 13/679,476, filed on Nov. 16, 2012, entitled "Vehicle Middleware"; Ser. No. 13/679,306, filed on Nov. 16, 2012, entitled "Method and System for Vehicle Data Collection Regarding Traffic"; Ser. No. 13/679,369, filed on Nov. 16, 2012, entitled "Method and System for Vehicle Data Collection"; Ser. No. 13/679,680, filed on Nov. 16, 2012, entitled "Communications Based on Vehicle Diagnostics and Indications"; Ser. No. 13/679,443, filed on Nov. 16, 2012, entitled "Method and System for Maintaining and Reporting Vehicle Occupant Information"; Ser. No. 13/678,762, filed on Nov. 16, 2012, entitled "Behavioral Tracking and Vehicle Applications"; Ser. No. 13/679,400, filed on Nov. 16, 2012, entitled "Vehicle Climate Control"; Ser. No. 13/840,240, filed on Nov. 16, 2012, entitled "Improvements to Controller Area Network Bus"; Ser. No. 13/678,773, filed on Nov. 16, 2012, entitled "Location Information Exchange Between Vehicle and Device"; Ser. No. 13/679,887, filed on Nov. 16, 2012, entitled "In Car Communication Between Devices"; Ser. No. 13/679,842, filed on Nov. 16, 2012, entitled "Configurable Hardware Unit for Car Systems"; Ser. No. 13/679,204, filed on Nov. 16, 2012, entitled "Feature Recognition for Configuring a Vehicle Console and Associated Devices"; Ser. No. 13/679,350, filed on Nov. 16, 2012, entitled "Configurable Vehicle Console"; Ser. No. 13/679,358, filed on Nov. 16, 2012, entitled "Configurable Dash Display"; Ser. No. 13/679,363, filed on Nov. 16, 2012, entitled "Configurable Heads-Up Dash Display"; and Ser. No. 13/679,368, filed on Nov. 16, 2012, entitled "Removable, Configurable Vehicle Console". The entire disclosures of the applications listed above are hereby incorporated by reference, in their entirety, for all that they teach and for all purposes.

FIELD

The disclosure relates generally to automated control of a vehicle and particularly to controlling perceptible output of a vehicle.

BACKGROUND

Many of today's vehicles incorporate a hybrid drive technology that incorporates at least partial use of an electrical motor to provide the driving force for the vehicle. Electric motors do not produce the well-known sounds of an internal combustion engine that pedestrians and bystanders normally associate with the presence of a vehicle. A hybrid drive typically comprises an electric motor and an engine working together to provide drive for the vehicle and charge batteries in the vehicle. When an engine is operating in a hybrid vehicle, the engine speed may not represent the speed of the vehicle. Further, when a hybrid vehicle is driven by the electric motor, the operation of the motor does not provide sufficient sound to give notice to pedestrians and bystanders of the presence, motion, and/or operating characteristics of the vehicle.

By contrast, the sounds generated by an internal combustion engine are well known. The sound of an accelerating vehicle, the sound of a large diesel truck, or the sound of a V8 engine compared to a smaller four cylinder engine are indicators to pedestrians and bystanders of the size, nature, and operating status of a vehicle.

In addition to the familiarity of the sounds of vehicles, the public is also aware of the use of sound as a branding tool to identify the manufacturer of a product, as typified by many television commercials. Modern vehicles typically comprise a high-powered sound system for use by the occupants of a vehicle. However, sound systems are not used to provide branding information and vehicle operating status information to pedestrians and bystanders within audible range of a vehicle.

SUMMARY

These and other needs are addressed by the various aspects, embodiments, and/or configurations of the present disclosure. The present disclosure is directed generally to a perceptible output control system for a vehicle, particularly for an electric vehicle.

In one embodiment, a method provides that includes the steps:

(a) determining, by a microprocessor executable output control system, a stimulus for generating a perceptible output for an occupant and/or non-occupant of a vehicle; and (b) providing, by an output source and one or more of interiorly and exteriorly to the vehicle, the perceptible output.

In another embodiment, a control system for a vehicle includes:

(a) a microprocessor executable data collector to collect sensed information for generating a perceptible output for an occupant and/or non-occupant of a vehicle; and (b) a microprocessor executable output controller to provide, by an output source and interiorly and/or exteriorly to the vehicle, the perceptible output.

The perceptible output can vary depending on the application.

In one application, the perceptible output comprises both audio and visual components and is provided to a non-occupant exterior to the vehicle. The perceptible output is in response to detection, by an imaging sensor, of an object in a probable path of the vehicle when the vehicle is in motion. The output of the imaging sensor can be used to determine a distance, trajectory and/or speed of the object. In other configurations, the perceptible output is in response to sensed information received from one or more of the following sensors: a wheel state sensor that senses one or more of vehicle speed, acceleration, deceleration, wheel rotation, wheel speed, and wheel slip, a power source energy output sensor that senses a power output of a vehicle power source by measuring one or more of current engine speed, and energy input and/or output, a switch state sensor that determines a current activation or deactivation state of a power source activation/deactivation switch, a transmission setting sensor that determines a current setting of a vehicle transmission, a gear controller sensor that determines a current setting of a vehicle gear controller, a power controller sensor that determines a current setting of a vehicle power controller, a brake sensor that determines a current state of a vehicle braking system, a seating system sensor that determines a seat setting and current weight of a seated vehicle occupant in a seat of the vehicle, exterior and/or interior sound receivers that receive and convert sound waves into an equivalent analog or digital signal, safety system state sensors that determine a current state of a vehicular safety system and/or seat belt setting, a brake control setting sensor, an accelerator pedal setting sensor, a clutch pedal setting sensor, an emergency brake pedal setting sensor, a door setting sensor, and a window setting sensor.

In another application, the perceptible output is associated with one or more of a particular brand, make, model, and type of the vehicle, with differing brands, makes, models, and types of vehicles having differing perceptible outputs. In one configuration, the perceptible output corresponds to an output profile. The corresponding output profile is selected by the control system from among a plurality of output profiles based on an identifier indicative of the particular brand, make, model, and type of the vehicle. The plurality of output profiles and identifier are commonly stored in memory on board the vehicle.

The perceptible output simulates noise emissions of an internal combustion engine. The perceptible output is emitted exteriorly and/or interiorly to the vehicle and is defined by a corresponding output profile. The output profile defines the perceptible output by values corresponding to one or more of pitch, frequency, wavelength, wavenumber, amplitude, sound intensity, sound pressure, sound quality, direction of sound propagation, and loudness and defines temporal changes in the one or more of pitch, frequency, wavelength, wavenumber, amplitude, sound intensity, sound pressure, sound quality, direction of sound propagation, and loudness.

In another application, the perceptible output simulates noise of a vehicle operation and is a function of a set of preferences of the occupant of the vehicle occupant, with differing occupants having differing corresponding perceptible outputs. The perceptible output corresponds to an output profile that is selected by the control system from among a plurality of output profiles based on input from or relating to an occupant of the vehicle. As noted above, the perceptible output is simulated noise emissions of an internal combustion engine. The perceptible output is for a brand, make, model, and type of vehicle different from the corresponding one of brand, make, model, and type of the vehicle. In other words, the vehicle operation is not occupant entertainment, and the perceptible output is neither music nor video.

In another application, the perceptible output is a function of a determined geographic location of the vehicle, with differing vehicle locations having differing corresponding perceptible outputs. The perceptible output is a function of received satellite positioning signals indicating a current location of the vehicle as a function of time. The current location of the vehicle is used to determine a feature in proximity to the vehicle.

In another application, the perceptible output is a function of a sensed roadside electronic device, with differing roadside electronic devices having differing corresponding perceptible outputs. The roadside electronic device indicates a possible presence of an animal, a pedestrian, a school, and a bicyclist.

In another embodiment, a method and control system are provided that include/perform the following steps/operations:

(a) determining a set of characteristics and/or parameters describing a selected sound component generated interiorly to a vehicle and received exteriorly to the vehicle;

(b) determining a noise-cancellation output to emit exteriorly of the vehicle to cancel by interference the selected sound component; and (c) emitting the noise-cancellation output exteriorly to the vehicle.

In one configuration, transfer functions in the frequency range between drive signals generated to cancel noise and the detected residual signals are determined adaptively.

The present disclosure can provide a number of advantages depending on the particular aspect, embodiment, and/or configuration. The disclosure can provide a mechanism to generate perceptible output, particularly synthetic engine sounds, that can not only provide brand recognition for the particular vehicle but also warn pedestrians and animals of approach of the vehicle. This can be particularly beneficial for an electric vehicle. Further safety benefits can be realized by adjusting and/or selecting perceptible output as a function of satellite positioning signals to determine a current location of the vehicle and input from roadside electronic devices. The human ear only perceives electric vehicles within a radius of approximately three meters. In the absence of the system and method described herein, pedestrians, particularly older people, people with visual or hearing impairment, children, and cyclists are particularly at risk in the absence of perceptible output. The disclosure can cancel (through destructive interference) selectively noise emanating from the interior of the vehicle, thereby maintaining privacy of the occupants.

These and other advantages will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The terms "determine", "calculate" and "compute," and variations thereof, as used herein, are used interchangeably and include any type of methodology, process, mathematical operation or technique.

The term "electric vehicle" refers to a vehicle that is powered, entirely or partially, by electricity, such as by one or more electric motors powered by a rechargeable electric battery rather than by an internal combustion engine (e.g., electric car). Hybrid vehicles are a type of electric vehicle.

The term "hybrid vehicle" refers to a vehicle using an on-board rechargeable energy storage system ("RESS") and a fuel-based power source for vehicle propulsion. In one application, hybrid vehicles recharge their batteries by capturing kinetic energy through regenerative braking Some hybrids use the combustion engine to generate electricity by spinning a generator to either recharge the battery or directly feed power to an electric motor that drives the vehicle.

The term "means" as used herein shall be given its broadest possible interpretation in accordance with 35 U.S.C., section 112, paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element. Also, while the disclosure is presented in terms of exemplary embodiments, it should be appreciated that individual aspects of the disclosure can be separately claimed.

The term "vehicle" refers to a device or structure for transporting animate and/or inanimate or tangible objects (e.g., persons and/or things), such as a self-propelled conveyance. The term "vehicle" as used herein includes any conveyance, or model of a conveyance, where the conveyance was originally designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, aircraft, space craft, flying machines, human-powered conveyances, and the like.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

DETAILED DESCRIPTION

In various embodiments, the disclosure is directed to an automated output control system in a vehicle that configures perceptible output depending on sensed, collected, and/or predetermined or pre-configured information. The output can be audio, visual, or a combination thereof. The output can be perceptible to non-occupants, such as pedestrians, occupants of other vehicles, bystanders, or others, and/or occupants of the vehicle. In various configurations, the output can be associated with a particular brand, make or manufacture, model, and/or or type of vehicle, a set of preferences of a vehicle user or occupant, ambient noise or sound characteristics such as for ambient sound suppression, and/or a selected or determined spatial location of the vehicle.

Figure 1:
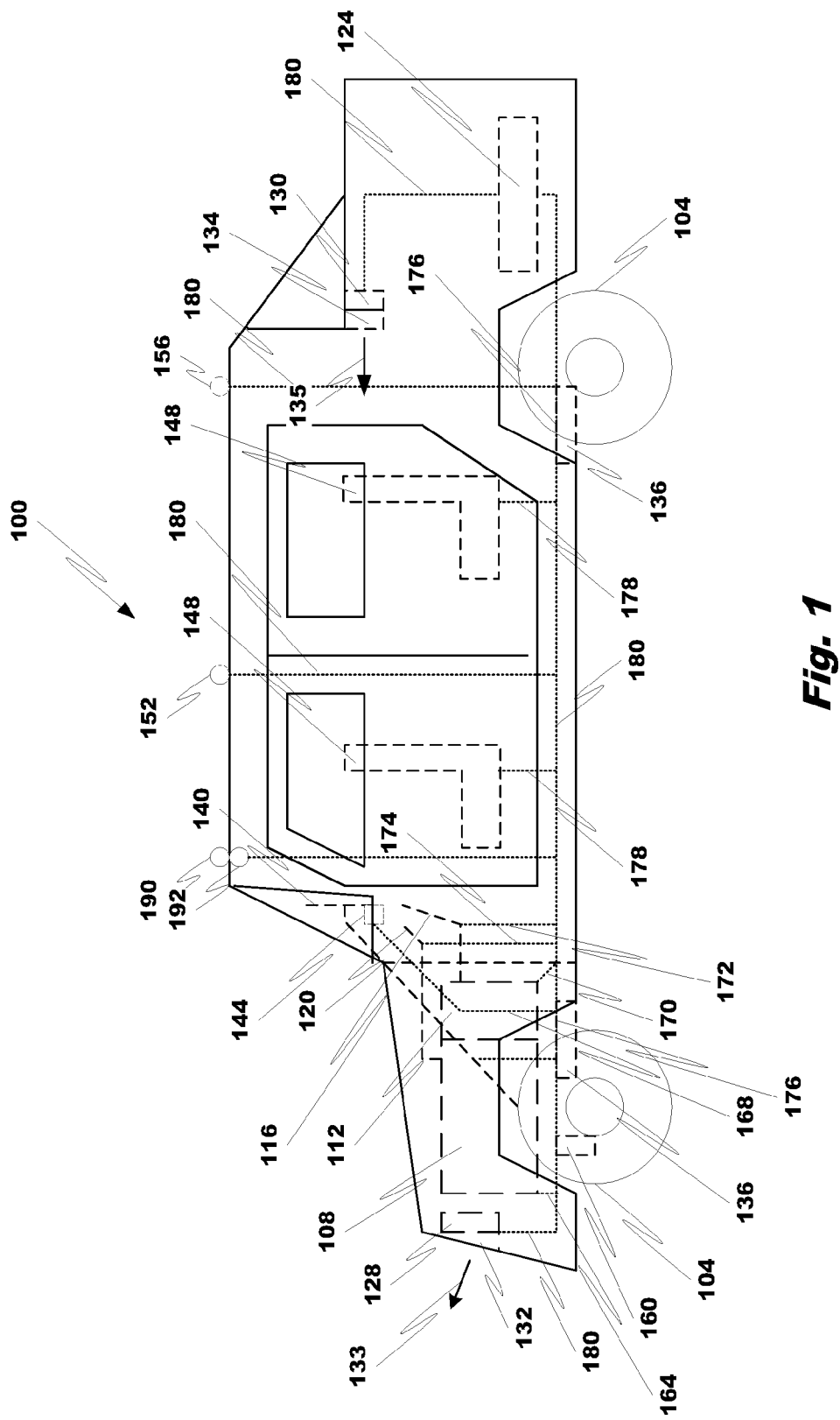
FIG. 1 is a side view of a vehicle according to an embodiment.

FIG. 1 illustrates a vehicle 100 according to an embodiment. The vehicle 100 includes, among many other components common to vehicles, wheels 104, a power source 108 (such as an engine, motor, or energy storage system (e.g., battery or capacitive energy storage system)), a manual or automatic transmission 112, a manual or automatic transmission gear controller 116, a power controller 120 (such as a throttle), an automated output control system 124, an external sound generation system 128 and sound transducer 132 to produce an emitted output 133, an internal sound generation system 130 (such as a synthesizer, amplifier, a shaping circuit, and/or mixer) and sound transducer 134 to produce an emitted output 135, a braking system 136, a steering wheel 140, a power source activation/deactivation switch 144 (e.g., an ignition), an occupant seating system 148, a wireless signal receiver 152 to receive wireless signals from signal sources such as roadside beacons and other electronic roadside devices, and a satellite positioning system receiver 156 (e.g., a Global Positioning System ("GPS") (US), GLONASS (Russia), Galileo positioning system (EU), Compass navigation system (China), and Regional Navigational Satellite System (India) receiver).

The vehicle 100 includes a number of sensors in wireless or wired communication with the output control system 124 to collect sensed information regarding the vehicle state, configuration, and/or operation. Exemplary sensors include wheel state sensor 160 to sense one or more of vehicle speed, acceleration, deceleration, wheel rotation, wheel speed (e.g., wheel revolutions-per-minute), wheel slip, and the like, a power source energy output sensor 164 to sense a power output of the power source 108 by measuring one or more of current engine speed (e.g., revolutions-per-minute), energy input and/or output (e.g., voltage, current, fuel consumption, and torque), and the like, a switch state sensor 168 to determine a current activation or deactivation state of the power source activation/deactivation switch 144, a transmission setting sensor 170 to determine a current setting of the transmission (e.g., gear selection or setting), a gear controller sensor 172 to determine a current setting of the gear controller 116, a power controller sensor 174 to determine a current setting of the power controller 120, a brake sensor 176 to determine a current state (braking or non-braking) of the braking system 136, a seating system sensor 178 to determine a seat setting and current weight of seated occupant, if any) in a selected seat of the seating system 148, exterior and interior sound receivers 190 and 192 (e.g., a microphone and other type of acoustic-to-electric transducer or sensor) to receive and convert sound waves into an equivalent analog or digital signal. Examples of other sensors (not shown) that may be employed include safety system state sensors to determine a current state of a vehicular safety system (e.g., air bag setting (deployed or undeployed) and/or seat belt setting (engaged or not engaged)), light setting sensor (e.g., current headlight, emergency light, brake light, parking light, fog light, interior or passenger compartment light, and/or tail light state (on or off)), brake control (e.g., pedal) setting sensor, accelerator pedal setting sensor, clutch pedal setting sensor, emergency brake pedal setting sensor, door setting (e.g., open, closed, locked or unlocked) sensor, window setting (open or closed) sensor, one or cameras or other imaging sensors (which commonly convert an optical image into an electronic signal but may include other devices for detection objects such as an electromagnetic radiation emitter/receiver that emits electromagnetic radiation and receives electromagnetic waves reflected by the object) to sense objects, such as other vehicles and pedestrians and optionally determine the distance, trajectory and speed of such objects, in the vicinity or path of the vehicle, and other sensors known to those of skill in the vehicle art.

In the depicted vehicle embodiment, the various sensors, external sound generation system 128, and internal sound generation system 130 are in communication with the output control system 124 via signal carrier network 180. As noted, the signal carrier network 180 can be a network of signal conductors, a wireless network (e.g., a radio frequency, microwave, or infrared communication system using a communications protocol, such as Wi-Fi), or a combination thereof.

The control system 124 comprises a (micro)processor 210, a read/write memory 220, a storage 230, a user interface I/O port 240, a network interface 250, a configurable port for other I/O 260, and an expansion I/O port 270, interconnected by a bus or wireless and/or wired network 280. The processor 210 can read from, and write to, the memory 220 and the storage 230 as is known in the art. The memory 220 and storage 230 comprise at least a (micro) processor 210 executable program (discussed with reference to FIGS. 3-4) for implementing the methods described herein. The user interface I/O port 240 provides a means to present information 284 to, and receive information 284 from, a user of the control system 200.

A user can be an occupant of a vehicle 100 that implements the system of FIG. 1. A user can further be an assembler, technician, or mechanic working on the vehicle to configure the system of FIG. 1 for use by an end-user of the vehicle.

In modern vehicles, subsystems such as an anti-lock braking system (ABS), engine control unit (ECU), and transmission control unit (TCU) are frequently interconnected using a standardized bus. Standardized buses for use in vehicles include Controller Area Network (CAN), and Local Interconnect Network (LIN) and others, as are known in the art. The network interface 250 can implement the vehicle network and receive sensed information 288. The network interface can also comprise other well-known networks such as Ethernet, Wi-Fi, USB, I²C, RS232, RS485 and FireWire. Preferably, the network interface 250 implements a standardized vehicle network. The configurable port for other I/O 260 and expansion I/O port 270 can receive additional information 292 and 296, respectively.

Figure 2:
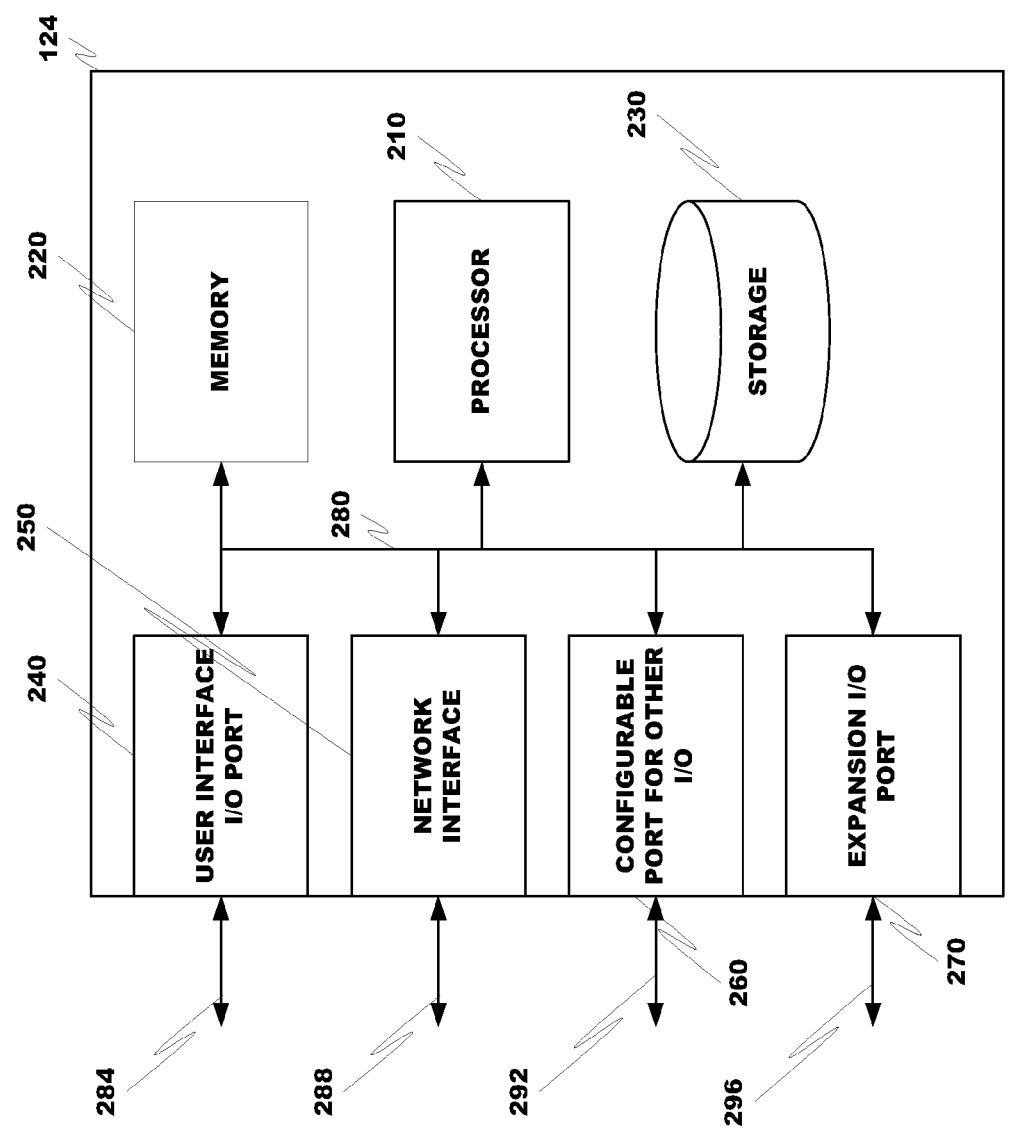
FIG. 2 is a block diagram of an output control system according to an embodiment.

FIG. 2 describes specific digital and analog inputs and outputs (collectively, I/O's). One skilled in the art will recognize that the control system 124 can be implemented using more or fewer I/O's than those shown.

In one implementation, the control system 124 receives and reads sensor signals, such as wheel and engine speed signals, as a digital input comprising a pulsewidth modulated (PWM) signal. The processor 210 can be configured, for example, to read each of the PWM signals into a port configured as a counter or configured to generate an interrupt on receipt of a pulse, such that the processor 210 can determine, for example, the engine speed in revolutions per minute (RPM) and the speed of the vehicle in miles per hour (MPH). One skilled in the art will recognize that the two signals can be received from existing sensors in a vehicle comprising a tachometer and a speedometer, respectively. Alternatively, the current engine speed and vehicle speed can be received in a communication packet as numeric values from a conventional dashboard subsystem comprising a tachometer and a speedometer. The transmission speed sensor signal can be similarly received as a digital input comprising a PWM signal coupled to a counter or interrupt signal of the processor 210, or received as a value in a communication packet on the network interface 250 from an existing subsystem of the vehicle. The ignition sensor signal can be configured as a digital input, wherein a HIGH value represents that the ignition is on and a LOW value represents that the ignition is OFF. Three bits of the expansion I/O 270 can be configured as a digital input to receive the gear shift position signal, representing eight possible gear shift positions. Alternatively, the gear shift position signal can be received in a communication packet as a numeric value on the network interface 250. The throttle position signal can be received as an analog input value, typically in the range 0-5 volts. Alternatively, the throttle position signal can be received in a communication packet as a numeric value on the network interface 250. The output of other sensors can be processed in a similar fashion.

The control system 124 receives the various signals and determines an output to be generated and emitted outside of the vehicle 100 and/or internal to the vehicle 100 (e.g., within the passenger compartment). In one configuration, the output emitted is audio. In another configuration, the output emitted is visual, particularly light from one or more light sources, including those set forth above. In other configurations, the output emitted includes both audio and visual components.

For emitted audio output, the control system 124 generates and transmits output generation commands incorporating the characteristics or parameters of the selected output profile 308 to an output source, such as a light source and/or the external and/or internal sound generation system 128, 130 and corresponding sound transducer 132, 134, respectively, to produce an emitted output 133, 135. For audio output, for instance, the sound generation system 128, 130 receives a sound generation command and generates an appropriate set of signals for communication to the corresponding sound transducer 132, 134 for audible emission. The control system 124 can further be coupled to a user interface 240 by a user interface signal 284 to enable a user to configure the operation of the control system 124 and sound generation system 128, 130. When the sounds generated by the control system are regulated by standards, such that a user is prohibited by law from altering the sounds generated by the control system, the user interface can be omitted.

Figure 3:
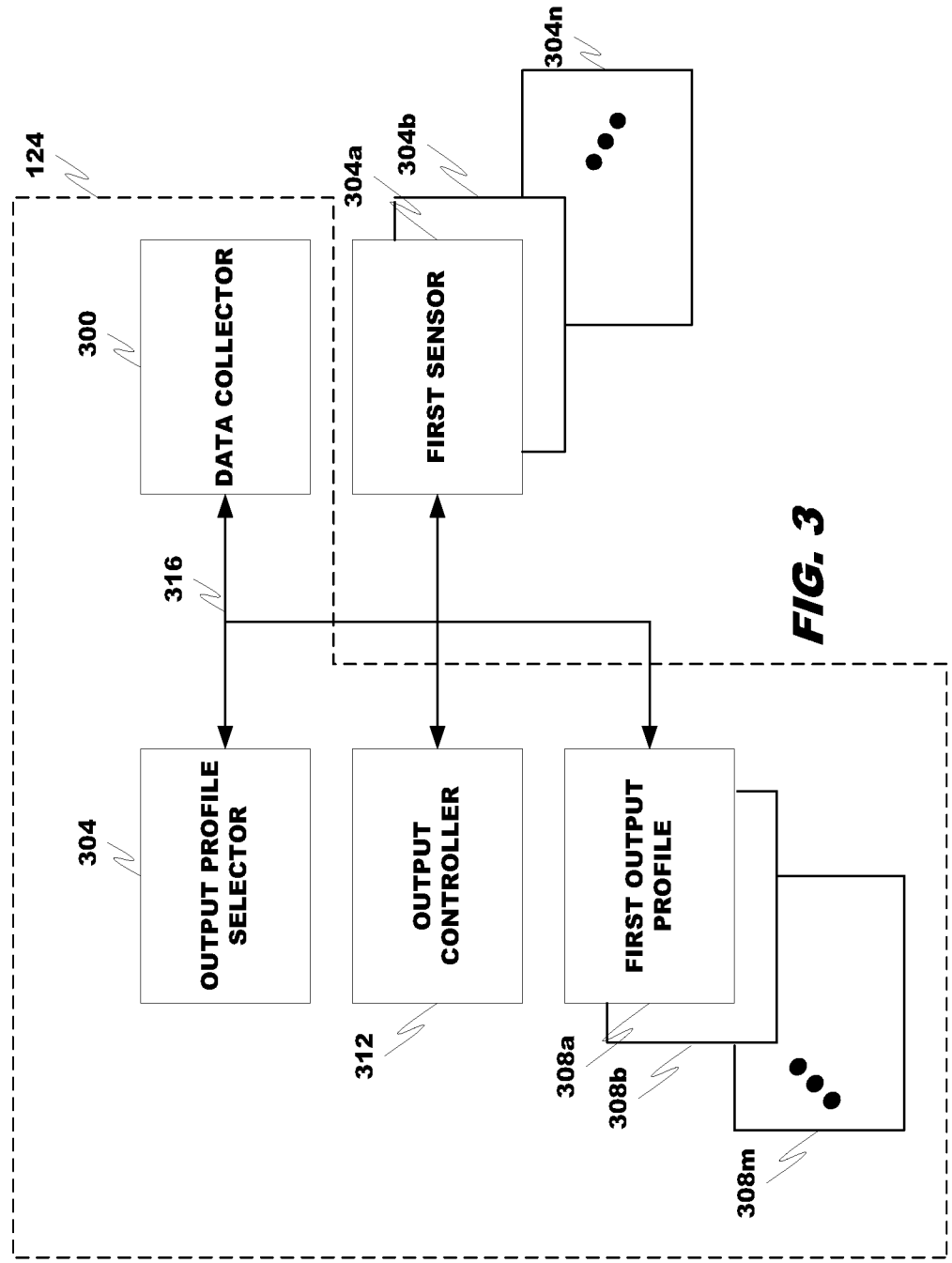
FIG. 3 is a block diagram of an output control system according to an embodiment.

Referring to FIG. 3, the functional components of the control system 124 include the data collector 300, output profile selector 304, first, second, . . . mth output profiles 308a-m, and output controller 312. The various components are interconnected by signal carrier 316, which may include components of the bus or network 280 and/or signal carrier network 180.

The data collector 300 receives, analyzes, and filters information from user input and/or one of the first, second, . . . nth sensors 304a-n discussed above and provides to the output profile selector 304 processed output related to the filtered information. As noted the first, second, . . . nth sensors 304a-n include the wireless signal receiver 152, satellite positioning system receiver 156, wheel state sensor 160, power source energy output sensor 164, a switch state sensor 168 to determine a current activation or deactivation state of the power source activation/deactivation switch 144, transmission setting sensor 170, gear controller sensor 172, power controller sensor 174, brake sensor 176, seating system sensor 178, exterior and interior sound receivers 190 and 192, safety system state sensors, light setting sensor, brake control sensor, clutch pedal setting sensor, emergency brake pedal setting sensor, door setting sensor, window setting sensor, and other sensors known to those of skill in the vehicle art.

The output profile selector 304 receives the processed output from the data collector 300, maps the processed output to a predetermined, default, and/or user selected set of rules or policies associated with the first, second, . . . mth output profiles 308a-m, and, based on the mapping operation, selects an appropriate one of the first, second, . . . mth output profiles 308a-m for execution. The profiles include a set of audio and/or visual characteristics to be emitted from the vehicle.

A typical set of audio characteristics include values for pitch or frequency, wavelength, wavenumber, amplitude, sound intensity, sound pressure, quality, direction of propagation, and/or loudness and changes in these parameters as a function of time. The output profile can, for example, simulate the noise of an engine and/or motor having defined characteristics, generate music, generate sound typically made by a selected brand, make or manufacture, model, and/or or type of vehicle, generate common background noise, provide sound substantially cancelling undesirable or unwanted noise or other sound.

A typical set of visual characteristics include sets of states of selected exterior and interior light sources and, optionally, changes in those states as a function of time. The visual characteristics, for example, include which light sources are activated and/or deactivated as a function of time.

The output controller 312 generates output generation commands corresponding to the characteristics of the selected first, second, . . . mth output profile 308a-m and transmits the commands to the appropriate or selected output emission source, whether the external sound generation system 128, the internal sound generation system 130, and/or one or more of the headlights, emergency lights, brake lights, parking lights, fog lights, interior or passenger compartment lights, panel or dash lights, and/or tail lights to produce the emitted output corresponding to the selected output profile.

The control system 124 may be pre-loaded in the memory of an on-board computer or directly into memory 220 or storage 230. The output profiles may be pre-loaded into the memory 124 at the time of manufacture for subsequent selection by a user or the control system based on collected information.

Alternatively, the control system 124 can be loaded into the memory of an on board computer, such as a sound synthesizing application downloaded over the Internet.

The operation of the control system 124 will be described with reference to various examples.

In a first example, the control system 124 uses customized, either default or driver selected, synthetic sounds for vehicles, particularly serial or parallel hybrid or electrically propelled vehicles. The sounds can be broadcast inside or outside of the passenger compartment. The audio output can be a branding or customization tool for electrically propelled vehicles. The vehicle can, for instance, have a plurality of selectable automotive output profiles. The control system 124 can determine the particular brand, make or manufacture, model, and/or or type of vehicle by information (e.g., serial number) provided by a resident vehicle electronic module (such as the ECU or TCU) and thereby select an appropriate output profile to provide different output profiles for different brands, types, models, or manufactures of vehicle. The control system 124, based upon a sensed identifier of the car (which may or may not be unique), causes an appropriate output profile to be executed.

The sensed identifier of the vehicle may be unique to the vehicle (such as a vehicle identification number), collectively unique to a set of similar vehicles, or non-unique but may have some other identifying feature based upon other parameters. For example, if the car is a Toyota, it will have a first identifier regardless of model, and the control system 124 will cause emission of a first set of sound parameters or characteristics. If the car is a GM, it will have a second different identifier regardless of model, and the control system 124 will cause emission of a second different set of sound parameters or characteristics.

The output profile can vary depending on the application. In one application, the vehicle will have a output profile unique to the specific manufacture and model. In yet another application, the vehicle will have an identifier unique to the specific engine type and size regardless of the manufacture or model. In other applications, the emitted set of sound parameters or characteristics is unique to the manufacture and model of car. In some applications, memory 220 and/or storage 230 stores a plurality of user selectable automotive output profiles.

Each of the output profiles are associated with a signature vehicle sound based upon a distinguishing feature of the driver, vehicle, and/or other generic features not necessarily related to or substantially independent of the present operating conditions of the vehicle.

Each output profile can be further associated, by a user, vendor, or manufacturer, with specified conditions, e.g., vehicle location, speed or acceleration, brake position, accelerator position, etc.

In a further example, the control system 124 associates an output profile with a selected vehicle that is not representative of the brand, type, model, or manufacture of the vehicle. For instance, the output profile could produce a synthesized sound output that is for a different brand, type, model, or manufacture of the vehicle. By way of illustration, a selected output profile for a car might produce a synthesized sound output for a truck, tractor-trailer, motorcycle, aircraft, or the like.

In a further example, the control system 124 uses an automotive controller, sensor subsystem, and/or control feedback loop (which includes the exterior and interior sound receivers 190 and 192) to select, configure and provide the sound. The sensor subsystem can detect ambient noise levels, noise levels within the passenger compartment, vehicular speed, engine RPMs, external objects nearby, or a combination of such parameters or sensed feedback, and the control system 124 uses the sensor signals to determine the type and/or parameters of the sound emitted. The sound emitted can substantially cancel the detected ambient noise or a component thereof or provide desired background noise.

In a further example, the control system 124 receives sensed information regarding a vehicle component, such as an ignition, motor, engine, brake, forward/reverse gear engagement, engine type (e.g., diesel or gasoline), drive shaft, and the like and, depending upon its setting or state, uses the sensed information to determine which output profile is to be synthesized or emitted. A visually perceptible output, such as a strobed, flashed, or varied or constant light output, can be emitted (for viewing by the driver and/or nearby drivers and pedestrians) with synthesized sound when an object, such as a pedestrian, is in the path of the vehicle. This can warn the pedestrian of the oncoming vehicle.

In a further example, the control system 124, based on input from one or cameras or other imaging sensors, senses objects, such as other vehicles and pedestrians, determines the distance, actual or estimated trajectory and actual or estimated speed of such objects, and determines a risk or probability of collision. The collision risk can be determined by many techniques, such as comparing the foregoing information with the vehicles projected path of travel. The selected output profile can be a function of the collision risk; that is, when the collision risk falls within a first range a first output profile is selected and when the collision risk falls within a different (non-overlapping) second range a different second output profile is selected. The different profiles can cause desirable effects to occur, such as increasing the volume of the output 132 and/or 135, combining visual output with the audio output or vice versa, and the like.

In a further example, the control system 124 uses an algorithm, using sensors and satellite positioning system signals, to determine external conditions and/or surroundings and/or vehicle location to provide a determined (or customized) audio output. For instance, the sound emitted is location dependent. The vehicle location is mapped to a street map to determine a type of roadway (e.g., freeway or surface or side street) being traveled and an appropriate output profile selected to emit a sound appropriate to the roadway type, surroundings, or location. For example, a first sound is emitted on a surface or side street in a highly populated area (due to the danger of a pedestrian accident) and a second different sound is emitted on a freeway through a rural setting (to avoid a vehicular, livestock, or game accident). The sound emitted may be further manipulated by signal processing for safety or legal reasons for a location (e.g., reducing the sound level if the local laws regulate vehicle sound to a certain loudness). This signal processing can be to be applied to all sound outputs to ensure that the actual emitted sound complies with the safety or legal standard for that location. Stated another way, the control system 124 changes the emitted output for safety reasons, such as a tone for the pedestrian at a crosswalk or noise control reasons when local laws regulates certain noise levels or sound.

In a further example, a different output profile is associated with a different driver of a common vehicle. Stated another way, a different drivers of the vehicle have different associated output profiles. In this configuration, the identity of the driver can be sensed in many ways, including such as through a detected driver input, a facial or retinal image of the driver, a sensed driver weight, a sensed seat setting, and the like or a combination thereof.

In a further configuration, the output profile selected for execution depends on roadside beacons and other electronic roadside devices, such as deer crossing signs, pedestrian crosswalk signs, and the like. The signs and other devices can be powered, such as by a solar or grid power source, and emit an identifier signal to be sensed by the wireless receiver 152 of the vehicle 100 and used to select the appropriate output profile.

In a further example, the vehicle is fitted with separate sound transducers and sound generating system for both outside and inside the vehicle. The sound generated for outside and inside of the vehicle may also be different from one another.

In a further example, the control system 124 determines the characteristics or parameters describing a selected noise and generates or selects an output profile to produce a synthesized sound to substantially and effectively cancel the selected noise. The selected noise may be internal and/or external to the vehicle, particularly in the passenger compartment. As will be appreciated, sound is a P-wave, which includes a compression phase and a rarefaction phase. A noise-cancellation output is a sound wave with substantially the same amplitude but with an inverted phase (also known as antiphase) to the targeted or selected noise. The waves combine to form a new wave, in a process called interference, and effectively cancel each other out—an effect which is called phase cancellation. Noise cancellation can be achieved through the use of analog circuits or digital signal processing. In the latter noise cancellation technique, an adaptive algorithm can analyze the waveform of the background aural or nonaural noise and generate a signal that will either phase shift or invert the polarity of the original signal. This inverted signal (in antiphase) is then amplified and a transducer creates a sound wave directly proportional to the amplitude of the original waveform creating destructive interference. This will effectively reduce the volume of the perceivable noise. In one implementation, the user can select sequentially different and discrete noise components for cancellation and, based upon noise cancellation results, determine which noise component or set of noise components to target for cancellation by the control system 124.

By way of illustration, the occupant of the vehicle may desire an audio output 133 to non-occupants but find the audio output 133 to be undesirable in the passenger compartment. When the audio output 133 is generated, the exterior sound receiver 190 receives and processes the resulting audio output 133 and compares its characteristics against the characteristics in the selected output profile to confirm that the output has the selected characteristics. Additionally, any output 133 entering the passenger compartment is detected by the interior sound receiver 192 and directed to the control system 124. The control system 124 receives and compares the sound detected by the interior sound receiver 192 against the sound detected by the exterior sound receiver 190 to isolate the components of the detected sound attributable to the detected output 133 and determines a noise-cancellation output or a sound wave with substantially the same amplitude but with an inverted phase (also known as antiphase) to the output 133. The control system 124 then causes the noise-cancellation output to be provided in the passenger compartment as output 135.

The converse is also true; that is, noise cancellation of output 135 (and/or other sound generated by occupants or devices in the passenger compartment) such that the output 135 or other sound is not perceptible to bystanders outside the vehicle. In this application, the interior sound receiver 192 receives and processes the resulting audio output 135 or other sound in the passenger compartment. The audio output 135 or other sound leaving the passenger compartment is detected by the exterior sound receiver 190 and directed to the control system 124. The control system 124 receives and compares the sound detected by the exterior sound receiver 190 against the sound detected by the interior sound receiver 192 to isolate the components of the detected sound attributable to sound emanating from the passenger compartment and determines a noise-cancellation output or a sound wave with substantially the same amplitude but with an inverted phase (also known as antiphase) isolated components. The control system 124 then causes the noise-cancellation output to be provided as output 133.

In a further example, sensors in or on the vehicle can determine persons or objects inside or outside the vehicle for purposes of selecting the appropriate output profile for execution.

In a further example, a visually perceptible output is displayed substantially simultaneously with the sound emitted. The visually perceptible output can be in the form such as a strobed, flashed, or varied of constant light output. In one configuration, the visually perceptible output is selectively displayed when a pedestrian or nearby driver or vehicle is detected as in the path of the subject vehicle. In another configuration, the visually perceptible output is displayed at all times and is available to the vehicle's driver as well as pedestrians or other drivers and vehicles.

In other examples, sensors in and/or on the car determine who is in the car or objects outside the car for purposes of selecting the appropriate sound.

As will be appreciated, the control system 124 can be used not only with hybrid or electric vehicles but also with internal combustion engine-equipped vehicles.

It is contemplated that a safety standard may be developed that dictates, specifically, the sounds that a vehicle shall make, the conditions under which the sound shall be generated, and even the decibel level and limit at which the sound shall be generated. A reasonable, simple standard includes generating a sound that is directly related to the operating speed of the vehicle. The sound can either be pulsed or continuous, fixed pitch or variable pitched, such that a pedestrian or bystander near a vehicle can determine the approximate speed of the vehicle.

Figure 4:
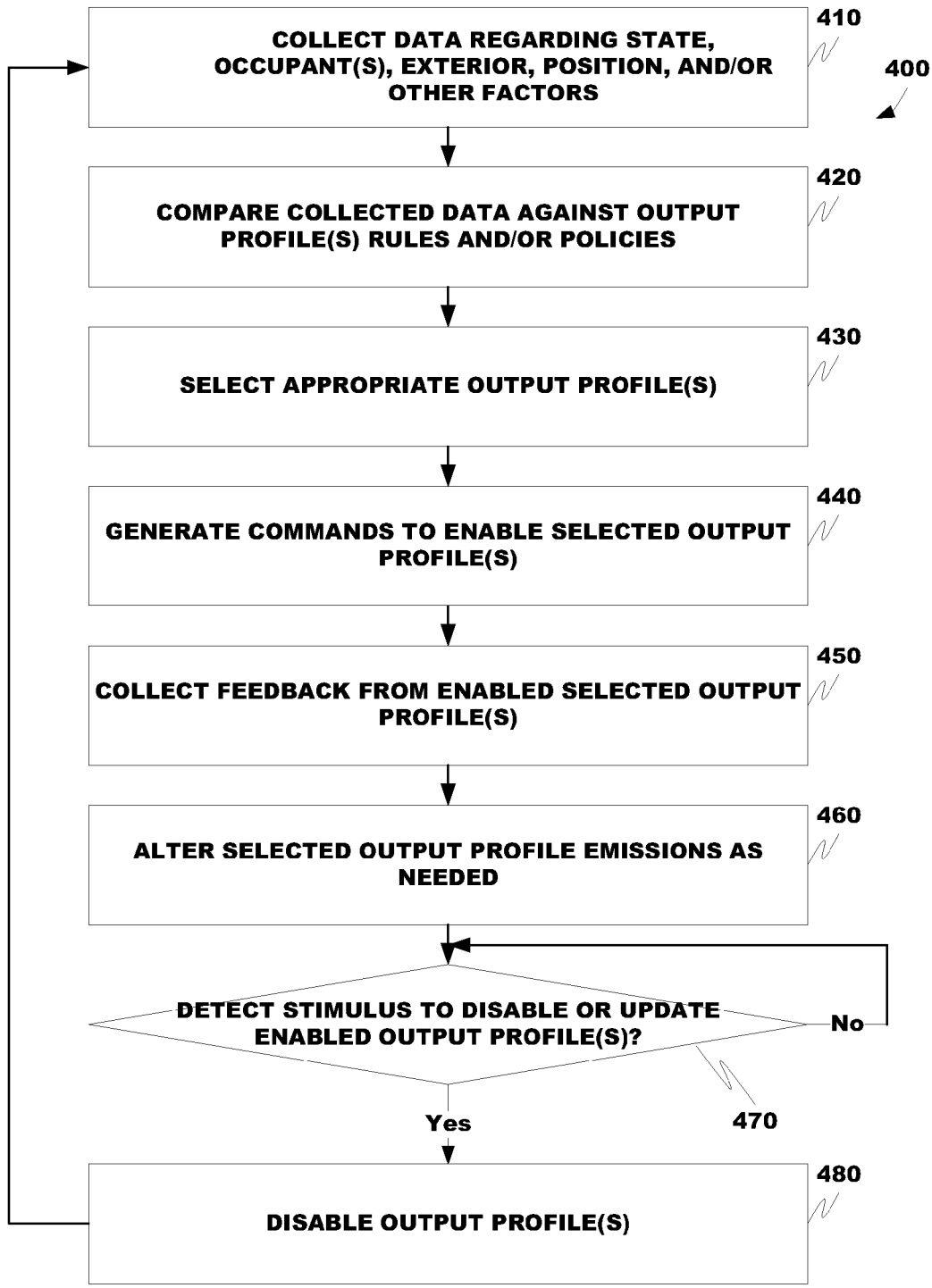
FIG. 4 is a logic flow diagram according to an embodiment.

An algorithm 400 employable by the control system 124 will now be described with reference to FIG. 4.

The algorithm commonly begins to execute upon receipt of a user command or determined sensor output signal. Depending upon the particular sensor that is received, and the sensed parameter value provided by that sensor, an output generation command may be generated for output to a sound generation system. A sensor reading indicating that the vehicle has been started can generate an audible output 133 indicating the brand of the vehicle, (e.g. Infiniti®), such that the attention of people within hearing of the sound will know that an Infiniti® vehicle is starting up. Manufacturers of vehicles may additionally choose to draw attention to a particular model of their brand, such as the Infiniti® G37S, by adding a model-specific audible output 133 to the brand-specific audible output 133. Alternatively, a manufacturer may choose to generate only the model-specific audio output 133. A sensor can also read a change in the braking system. An output 133 can be generated indicating that the parking brake has been released or applied or that the vehicle's main braking system has been released or applied. Such a signal notifies drivers, pedestrians, and bystanders of the operating state of the vehicle thereby increasing safety to those people within audible range of the sound generator. A sensor can also read the operating state of a drive component of the vehicle such as the engine speed, electric motor speed, transmission, wheel, axle, or a throttle position and generate a sound indicating the state of the drive component.

In step 410, the data collector 300 collects data or sensed information regarding a state, occupant(s) of the vehicle, vehicle exterior, vehicle position, and/or other factors. The collected data may be input by a user, received wirelessly over a wide area network, such as the Internet, and/or received from one or more first, second, . . . mth sensors 308*a-m*. In a preferred configuration, inputs 240, 250, 260, and/or 270 include information from various sensor subsystems as described above. These inputs include data such as ambient noise levels, noise levels within the passenger compartment, vehicular speed, engine RPMs, and/or external objects nearby.

In step 420, the output profile selector 304 compares or maps the collected data against rules or policies and, in step 430, selects one or more appropriate output profiles based on the mapping operation. The rules or policies, or the selected output profile(s), may specify which output components are to be generated by which identified output emission sources, such as the external sound generation system 128 and sound transducer 132 to produce an emitted output 133, internal sound generation system 130 and sound transducer 134 to produce an emitted output 135, and a light source described previously.

Typically, the parameters or the combination of these parameters or sensed feedback in the sensed signals determine the type and/or parameters of the sound emitted. In a preferred embodiment, the output profile is selected from a plurality of output profiles stored in a memory or storage device. Alternatively, the output profile can be programmed by a user or received from a repository source over the Internet or other networks. The output profile is normally associated with a signature vehicle sound based upon a distinguishing feature of the driver, vehicle, and/or other generic features not necessarily related to the present operating conditions of the vehicle.

In step 440, the control system 124 generates sound generating commands to enable the selected output profile(s) to be executed by the selected output emission source. In some configurations and embodiments, sound generating signal represents a fully amplified and mixed digital or analog sound signal that can be directly outputted by the sound generation system to sound transducer. In other configurations, sound generating signal may represent multiple signals that represent components of the final output sound, and the sound generating system further processes the sound generating signal.

For example, in one configuration, a vehicle component, such as an ignition, motor, engine, brake, forward/reverse gear engagement, engine type (e.g. diesel or gasoline), drive shaft, and the like as information sent to processor 210 from inputs 240, 250, 260, and/or 270, are used to generated a vehicle sound that corresponds to the current state of the vehicle as represented by these inputs. Depending upon the setting or the state of the vehicle or component, the corresponding sound can be synthesized or emitted. In one configuration, the synthesized sound through these inputs is combined with the selected output profile of output profiles to further correspond with the vehicle's generic unique sound signature. In another configuration, there is no selected output profile, and the vehicle will emit sound that only corresponds to the current operating state of the vehicle. In one configuration, the microprocessor executing the control system 124 calculation uses the selected output profile as a base vehicle sound and alters the base sound with the detected present vehicle conditions. For example, a Doppler-affected gradually higher pitched sound of the base vehicle sound may be generated if it is detected that the present vehicle condition is accelerating. In another configuration, the control system 124 determines separately the sound segments corresponding to the selected output profile and each detected vehicle condition, and the sound segments are later combined or separately emitted by the sound generation module to form the output corresponding to the output profile. In yet another configuration, the calculation and generation of these separate sound segments may depend on each other and thereby not a completely independent process.

In step 450, one or more sensors collect feedback from the enabled or executed selected output profile(s) and, in step 460, the control system 124 alters selected output profile emissions as needed. This provides adaptive control of the emitted output.

In decision diamond 470, the control system 124 determines whether a stimulus has been received to disable or update the enabled or executing output profile(s). For instance, an update is required when sensed information changes, such as the vehicle accelerating or decelerating. Updating is desired so that the emitted sound varies with vehicle speed. When a stimulus has been received, the control system 124 proceeds to step 480 and disables the output profile(s) so that no longer is executing. The control system 124 then returns to step 410. When a stimulus has not been received, the control system 124 repeats decision diamond 470.

Optionally, the method adds in external factors 360. External factors such as ambient noise and other factors not related to the present vehicle operational conditions may be considered in the sound calculation process to add further usability of the sound. For example, the emitted sound may be generated louder if the ambient noise is loud.

Optionally, the method may display a visually perceptible output 350 in conjunction with the emitted sound. In a preferred embodiment, the visually perceptible output takes the form of a strobed, flashed, or varied of constant light output and corresponds to the emitted sound.

The exemplary systems and methods of this disclosure have been described in relation to vehicle processing systems. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a vehicle computer system, a Personal Computer (PC), laptop, netbook, smart phone, Personal Digital Assistant (PDA), tablet, etc., or collocated on a particular node of a distributed network, such as an analog and/or digital communications network, a packet-switch network, or a circuit-switched network or collocated on a particular node of a distributed network, such as an analog and/or digital communications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a server. Similarly, one or more functional portions of the system could be distributed between a communications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

For example in one alternative embodiment, a plurality of sound generating systems are positioned around a defined internal region of the vehicle, such as the passenger compartment.

In another alternative embodiment, a plurality of sound generating systems are positioned around the periphery of the vehicle, such as at the front and rear of the vehicle for pedestrians and observers located in front of or behind the vehicle.

In another alternative embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   determining, by a microprocessor executable output control system, a stimulus for generating a perceptible output for at least one of an occupant and non-occupant of a vehicle; and
   providing, by an output source and at least one of interiorly and exteriorly to the vehicle, the perceptible output, wherein at least one of the following is true of the perceptible output:

(i) the perceptible output comprises both audio and visual components and is provided exteriorly to the vehicle in response to identification, by the microprocessor, of an object in a potential path of the vehicle when the vehicle is in motion;

(ii) the perceptible output comprises both audio and visual components and is associated with one or more of a particular brand, make, model, and type of the vehicle, with differing brands, makes, models, and types of vehicles having differing perceptible outputs, the perceptible output provided by the output source being selected, by the microprocessor executable output control system, from among a plurality of possible perceptible outputs based on an identifier indicative of one or more of a particular brand, make, model, and type of the vehicle;

(iii) the perceptible output comprises both audio and visual components and simulates noise of a vehicle operation and is a function of a set of vehicle occupant preferences, with differing possible occupants of the vehicle having differing corresponding perceptible outputs, the perceptible output provided by the output source being selected, by the microprocessor executable output control system, from among the differing corresponding perceptible outputs based on occupant input and/or an identifier of an occupant currently in the vehicle;

(iv) the perceptible output is provided exteriorly to the vehicle and is a function of a determined geographic location of the vehicle, with differing vehicle locations having differing corresponding perceptible outputs; and (v) the perceptible output is a function of a sensed roadside electronic device, with differing roadside electronic devices being associated with differing corresponding perceptible outputs.

2. The method of claim 1, wherein the perceptible output comprises both audio and visual components and is provided to a non-occupant exterior to the vehicle, the perceptible output is in response to detection, by an imaging sensor, of an object in a probable path of the vehicle when the vehicle is in motion.

3. The method of claim 2, wherein output of the imaging sensor is used to determine a distance, trajectory and/or speed of the object.

4. The method of claim 1, wherein the perceptible output comprises both audio and visual components and is provided to a non-occupant exterior to the vehicle, the perceptible output is in response to sensed information received from one or more of the following sensors: a wheel state sensor that senses one or more of vehicle speed, acceleration, deceleration, wheel rotation, wheel speed, and wheel slip, a power source energy output sensor that senses a power output of a vehicle power source by measuring one or more of current engine speed, and energy input and/or output, a switch state sensor that determines a current activation or deactivation state of a power source activation/deactivation switch, a transmission setting sensor that determines a current setting of a vehicle transmission, a gear controller sensor that determines a current setting of a vehicle gear controller, a power controller sensor that determines a current setting of a vehicle power controller, a brake sensor that determines a current state of a vehicle braking system, a seating system sensor that determines a seat setting and current weight of a seated vehicle occupant in a seat of the vehicle, exterior and/or interior sound receivers that receive and convert sound waves into an equivalent analog or digital signal, safety system state sensors that determine a current state of a vehicular safety system and/or seat belt setting, a brake control setting sensor, an accelerator pedal setting sensor, a clutch pedal setting sensor, an emergency brake pedal setting sensor, a door setting sensor, and a window setting sensor.

5. The method of claim 1, wherein the perceptible output is associated with one or more of a particular brand, make, model, and type of the vehicle, with differing brands, makes, models, and types of vehicles having differing perceptible outputs, the perceptible output corresponds to an output profile, wherein the corresponding output profile is selected by the control system from among a plurality of output profiles based on the identifier indicative of the particular brand, make, model, and type of the vehicle, and wherein the plurality of output profiles and identifier are stored in memory on board the vehicle.

6. The method of claim 1, wherein the perceptible output is associated with one or more of a particular brand, make, model, and type of the vehicle, with differing brands, makes, models, and types of vehicles having differing perceptible outputs, the perceptible output simulates noise emissions of an internal combustion engine, wherein the perceptible output is emitted exteriorly and/or interiorly to the vehicle, wherein an output profile corresponding to the output defines the perceptible output by values corresponding to one or more of pitch, frequency, wavelength, wavenumber, amplitude, sound intensity, sound pressure, sound quality, direction of sound propagation, and loudness and defines temporal changes in the one or more of pitch, frequency, wavelength, wavenumber, amplitude, sound intensity, sound pressure, sound quality, direction of sound propagation, and loudness, and wherein the vehicle is an electric vehicle.

7. The method of claim 1, wherein the perceptible output simulates noise of a vehicle operation and is a function of a set of preferences of the occupant of the vehicle occupant, with differing possible occupants having differing corresponding perceptible outputs, the perceptible output corresponds to an output profile, wherein the corresponding output profile is selected by the control system from among a plurality of output profiles based on input from or relating to an occupant of the vehicle, and wherein the plurality of output profiles are stored in memory on board the vehicle.

8. The method of claim 7, wherein the perceptible output is simulated noise emissions of an internal combustion engine, wherein the perceptible output is emitted exteriorly and/or interiorly to the vehicle, and wherein an output profile corresponding to the output defines the perceptible output by values corresponding to one or more of pitch, frequency, wavelength, wavenumber, amplitude, sound intensity, sound pressure, sound quality, direction of sound propagation, and loudness and defines temporal changes in the one or more of pitch, frequency, wavelength, wavenumber, amplitude, sound intensity, sound pressure, sound quality, direction of sound propagation, and loudness.

9. The method of claim 8, wherein the perceptible output is for a brand, make, model, and type of vehicle different from the corresponding one of brand, make, model, and type of the vehicle.

10. The method of claim 7, wherein the vehicle operation is not occupant entertainment and the perceptible output is neither music nor video and wherein the identity of the occupant is determined automatically and appropriate output profile selected.

11. The method of claim 1, wherein the perceptible output is a function of a determined geographic location of the vehicle, with differing vehicle locations having differing corresponding perceptible outputs, the perceptible output is a function of received satellite positioning signals indicating a current location of the vehicle as a function of time and further comprising using the current location of the vehicle to determine a feature in proximity to the vehicle.

12. The method of claim 1, wherein the perceptible output is a function of a sensed roadside electronic device, with differing roadside electronic devices having differing corresponding perceptible outputs, the roadside electronic device indicates a possible presence of an animal, a pedestrian, a school, and a bicyclist.

13. The method of claim 1, wherein the perceptible output is emitted one or interiorly and exteriorly to the vehicle and further comprising:
  emitting the other of interiorly and exteriorly to the vehicle a noise-cancellation output, the noise-cancellation output having substantially the same amplitude but with an inverted phase to a selected component of the perceptible output, whereby the selected component is substantially cancelled by interference.

14. A tangible and non-transitory computer readable medium comprising microprocessor executable instructions to perform the steps of claim 1.

15. A method, comprising:
  determining, by a control system, a set of characteristics and/or parameters describing a selected sound component generated interiorly to a vehicle and emitted exteriorly to the vehicle;
  determining, by the control system, a noise-cancellation output to emit exteriorly of the vehicle to cancel by interference the selected sound component; and
  emitting, by a sound generation system, the noise-cancellation output exteriorly to the vehicle.

16. The method of claim 15, wherein the noise-cancellation output has substantially the same amplitude but with an inverted phase to the selected sound component, whereby the selected sound component is substantially cancelled by interference.

17. A tangible and non-transitory computer readable medium comprising microprocessor executable instructions to perform the steps of claim 15.

18. A vehicle control system operable to perform the steps of claim 15.

19. A control system for a vehicle, comprising:
  a microprocessor;
  a microprocessor executable data collector to collect sensed information for generating a perceptible output for at least one of an occupant and non-occupant of a vehicle; and
  a microprocessor executable output controller to provide, by an output source and at least one of interiorly and exteriorly to the vehicle, the perceptible output, wherein at least one of the following is true of the perceptible output:
  (i) the perceptible output comprises both audio and visual components and is provided exteriorly to the vehicle in response to identification by the microprocessor of an object in a path of the vehicle when the vehicle is in motion;
  (ii) the perceptible output comprises both audio and visual components and is associated with one or more of a particular brand, make, model, and type of the vehicle, with differing brands, makes, models, and types of vehicles having differing perceptible outputs, the perceptible output provided by the output source being selected, by the microprocessor executable output controller, from among a plurality of possible perceptible outputs based on an identifier indicative of one or more of a particular brand, make, model, and type of the vehicle;
  (iii) the perceptible output comprises both audio and visual components and simulates noise of a vehicle operation and is a function of a set of vehicle occupant preferences, with differing possible occupants of the vehicle having differing corresponding perceptible outputs, the perceptible output provided by the output source being selected, by the microprocessor executable output controller, from among the differing corresponding perceptible outputs based on occupant input and/or an identifier of an occupant currently in the vehicle;
  (iv) the perceptible output is provided exteriorly to the vehicle and is a function of a determined geographic location of the vehicle, with differing vehicle locations being associated with differing corresponding perceptible outputs; and
  (v) the perceptible output is a function of a sensed roadside electronic device, with differing roadside electronic devices having differing corresponding perceptible outputs.

20. The vehicle of claim 19, wherein the perceptible output comprises both audio and visual components and is provided to a non-occupant exterior to the vehicle, the perceptible output is in response to detection, by an imaging sensor, of an object in a probable path of the vehicle when the vehicle is in motion.

21. The vehicle of claim 20, wherein output of the imaging sensor is used to determine a distance, trajectory and/or speed of the object.

22. The vehicle of claim 19, wherein the perceptible output comprises both audio and visual components and is provided to a non-occupant exterior to the vehicle, the perceptible output is in response to sensed information received from one or more of the following sensors: a wheel state sensor that senses one or more of vehicle speed, acceleration, deceleration, wheel rotation, wheel speed, and wheel slip, a power source energy output sensor that senses a power output of a vehicle power source by measuring one or more of current engine speed, and energy input and/or output, a switch state sensor that determines a current activation or deactivation state of a power source activation/deactivation switch, a transmission setting sensor that determines a current setting of a vehicle transmission, a gear controller sensor that determines a current setting of a vehicle gear controller, a power controller sensor that determines a current setting of a vehicle power controller, a brake sensor that determines a current state of a vehicle braking system, a seating system sensor that determines a seat setting and current weight of a seated vehicle occupant in a seat of the vehicle, exterior and/or interior sound receivers that receive and convert sound waves into an equivalent analog or digital signal, safety system state sensors that determine a current state of a vehicular safety system and/or seat belt setting, a brake control setting sensor, an accelerator pedal setting sensor, a clutch pedal setting sensor, an emergency brake pedal setting sensor, a door setting sensor, and a window setting sensor.

23. The vehicle of claim 19, wherein the perceptible output is associated with one or more of a particular brand, make, model, and type of the vehicle, with differing brands, makes, models, and types of vehicles having differing perceptible outputs, the perceptible output corresponds to an output profile, wherein the corresponding output profile is selected by a microprocessor executable output profile selector from among a plurality of output profiles based on the identifier indicative of the particular brand, make, model, and type of the vehicle, and wherein the plurality of output profiles and identifier are stored in memory on board the vehicle.

24. The vehicle of claim 19, wherein the perceptible output is associated with one or more of a particular brand, make, model, and type of the vehicle, with differing brands, makes, models, and types of vehicles having differing perceptible outputs, the perceptible output simulates noise emissions of an internal combustion engine, wherein the perceptible output is emitted exteriorly and/or interiorly to the vehicle, wherein an output profile corresponding to the output defines the perceptible output by values corresponding to one or more of pitch, frequency, wavelength, wavenumber, amplitude, sound intensity, sound pressure, sound quality, direction of sound propagation, and loudness and defines temporal changes in the one or more of pitch, frequency, wavelength, wavenumber, amplitude, sound intensity, sound pressure, sound quality, direction of sound propagation, and loudness, and wherein the vehicle is an electric vehicle.

25. The vehicle of claim 19, wherein the perceptible output simulates noise of a vehicle operation and is a function of a set of preferences of the occupant of the vehicle occupant, with differing occupants having differing corresponding perceptible outputs, the perceptible output corresponds to an output profile, wherein the corresponding output profile is selected by a microprocessor executable output profile selector from among a plurality of output profiles based on input from or relating to an occupant of the vehicle, and wherein the plurality of output profiles are stored in memory on board the vehicle.

26. The vehicle of claim 25, wherein the perceptible output is simulated noise emissions of an internal combustion engine, wherein the perceptible output is emitted exteriorly and/or interiorly to the vehicle, and wherein an output profile corresponding to the output defines the perceptible output by values corresponding to one or more of pitch, frequency, wavelength, wavenumber, amplitude, sound intensity, sound pressure, sound quality, direction of sound propagation, and loudness and defines temporal changes in the one or more of pitch, frequency, wavelength, wavenumber, amplitude, sound intensity, sound pressure, sound quality, direction of sound propagation, and loudness.

27. The vehicle of claim 26, wherein the perceptible output is for a brand, make, model, and type of vehicle different from the corresponding one of brand, make, model, and type of the vehicle.

28. The vehicle of claim 25, wherein the vehicle operation is not occupant entertainment and the perceptible output is neither music nor video and wherein the identity of the occupant is determined automatically and appropriate output profile selected.

29. The vehicle of claim 26, wherein the perceptible output is a function of a determined geographic location of the vehicle, with differing vehicle locations having differing corresponding perceptible outputs, the perceptible output is a function of received satellite positioning signals indicating a current location of the vehicle as a function of time and further comprising using the current location of the vehicle to determine a feature in proximity to the vehicle.

30. The vehicle of claim 19, wherein the perceptible output is a function of a sensed roadside electronic device, with differing roadside electronic devices having differing corresponding perceptible outputs, the roadside electronic device indicates a possible presence of an animal, a pedestrian, a school, and a bicyclist.

31. The vehicle of claim 19, wherein the perceptible output is emitted one or interiorly and exteriorly to the vehicle and further comprising:

emitting the other of interiorly and exteriorly to the vehicle a noise-cancellation output, the noise-cancellation output having substantially the same amplitude but with an inverted phase to a selected component of the perceptible output, whereby the selected component is substantially cancelled by interference.

* * * * *